(12) United States Patent
Eschbach et al.

(10) Patent No.: US 6,342,951 B1
(45) Date of Patent: Jan. 29, 2002

(54) GAMUT MAPPING ALGORITHM USING INVERTED GAMMA FUNCTION

(75) Inventors: Reiner Eschbach, Webster; Karen M. Braun, Henrietta; Thyagarajan Balasubramanian, Webster; William A. Fuss, Rochester, all of NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/213,656

(22) Filed: Dec. 16, 1998

(51) Int. Cl.[7] .............................. G06F 15/00; G03F 3/08
(52) U.S. Cl. .......................................... 358/1.9; 358/519
(58) Field of Search ........................ 358/1.9, 519–534, 358/536, 539, 455, 464, 518, 804; 382/167, 162, 166

(56) References Cited

U.S. PATENT DOCUMENTS

| | | | | |
|---|---|---|---|---|
| 5,414,538 A | | 5/1995 | Eschbach | 358/522 |
| 5,477,305 A | * | 12/1995 | Parker et al. | 358/456 |
| 6,043,909 A | * | 12/1995 | Holub | 358/504 |
| 5,611,030 A | | 3/1997 | Stokes | 395/131 |
| 5,617,116 A | * | 4/1997 | Edgar | 345/150 |
| 5,649,072 A | | 7/1997 | Balasubramanian | 395/109 |
| 5,710,824 A | | 1/1998 | Mongeon | 382/162 |
| 5,739,927 A | | 4/1998 | Balasubramanian et al. | 358/518 |

FOREIGN PATENT DOCUMENTS

JP 2000184225 * 6/2000

OTHER PUBLICATIONS

Pariser, E.G., An Investigation of Color Gamut Reduction Techniques, IS&T 2nd Symposium on Electronic Publishing, pp. 105–107 (1991).
Sara, J.J., The Automated Reproduction of Pictures with Nonreproducible Colors, 1984.

* cited by examiner

Primary Examiner—Madeleine Nguyen
(74) Attorney, Agent, or Firm—Fay, Sharpe, Fagan, Minnich & McKee, LLP

(57) ABSTRACT

A new and improved method for mapping out-of-gamut colors into an output gamut in a manner which results in an output image created by an image output terminal which is aesthetically pleasing and faithful to the original input image. A plurality of input pixel color values IPV comprising an input gamut IG are respectively mapped to a corresponding plurality of output pixel color values OPV so that the dynamic lightness range of the input gamut IG is compressed to that of the output gamut OG. This is accomplished by inverting at least one of the gray values defining the input pixel value IPV, applying a gamma function thereto, and then reversing the inversion step. The value of gamma γ controls the amount of lightness compression and is selected based upon either the darkest actual or the darkest expected color in the input gamut IG as compared to the darkest color in the output gamut OG. If necessary, a subsequent gamut clipping operation is performed to map all resulting out-of-gamut output pixel values XOPV to values in the output gamut OG as a second processing step. Preferably, a centroid gamut clipping operation is used to map each out-of-gamut value XOPV to the surface SOG of the output gamut OG.

21 Claims, 3 Drawing Sheets

GAMUT MAPPING ALGORITHM USING INVERTED GAMMA FUNCTION

INCORPORATION BY REFERENCE

The disclosure of commonly assigned U.S. Pat. No. 5,414,538 to Eschbach issued May 9, 1995 and entitled "Image-Dependent Exposure Enhancement" is expressly incorporated by reference herein as are the following documents: (1) Sara, J. J., *The Automated Reproduction of Pictures with Nonreproduicible Colors,* Ph.D. Thesis, Massachusetts Institute of Technology, 1984; and, (2) Pariser, E. G., *An Investigation of Color Gamut Reduction Techniques,* IS&T 2nd Symposium on Electronic Publishing, 105–107 (1991).

BACKGROUND OF THE INVENTION

In the color digital image processing arts, the space of colors that a printer (or other output device) is capable of reproducing is referred to as the "gamut" of the printer. Very often, colors specified in a digital image cannot be reproduced by a particular printer when it comes time to output the color digital image to the printer for purposes of rendering a hard copy printed output of the digital image. The printer gamut (also referred to herein as the output gamut) is often limited when compared to the gamut of the source digital image (the input gamut) due to physical limitations of the printer's colorants. Colors in the input gamut but not in the output gamut are said to be "out-of-gamut" and must be accounted for before the digital image may be printed—i.e., areas in the output document where these colors are to be found may not simply be left blank in the final printed document.

One prior technique for dealing with out-of-gamut colors in a digital image involves mapping each out-of-gamut color to a color on the gamut "surface" while leaving the remaining colors in the digital image untouched. This technique, commonly referred to as "clipping," has heretofore been thought to be desirable for purposes of preserving hue angle, lightness, and/or saturation, or minimizing color errors when mapping the out-of-gamut colors to the surface of the three-dimensional printer gamut. However, viewers often do not like the resulting image. Clipping often leads to unwanted artifacts in the printed image such as the apparent flattening of curved surfaces and loss of color detail information due to its "many-to-one" mapping approach. Accordingly, simply clipping out-of-gamut colors in this manner has been found to be undesirable.

Another prior approach involves "compressing" the input gamut by mapping both in-gamut and out-of-gamut pixels of a digital image to colors in the output gamut through use of three-dimensional look-up tables. A goal of this approach is to preserve smooth color transitions in images. However, this technique has been found to result in undesired desaturation or "washing-out" of images.

In general, when judged in terms of viewer satisfaction, prior gamut mapping techniques have been found to be sub-optimal. While these prior techniques commonly attempt to preserve hue angle, or both hue angle and lightness in an image, the resulting image often lacks perceived contrast due to the fact that the slope of the input-to-output lightness function is reduced to less than 1 in an attempt to preserve information. Furthermore, conventional gamut compression techniques (where the entire input gamut is compressed into the output gamut) are typically implemented in three-dimensional look-up tables which makes modification of the look-up tables for a given image computationally cost prohibitive—i.e., use of three-dimensional look-up tables does not facilitate modification of the gamut mapping method to account for characteristics of a particular digital image due to the computational cost in creating and manipulating a three-dimensional look-up table.

Accordingly, it has been deemed desirable to provide a gamut mapping method not requiring use of a three-dimensional look-up table and wherein perceived contrast in the output image is not reduced and so that the appearance of objects in the image is preserved without undesired desaturation. Furthermore, it has been deemed desirable to provide a gamut mapping method suitable for modification on an image-by-image basis according to image statistical data to improve the resulting image.

SUMMARY OF THE INVENTION

In accordance with the present invention, a new and improved color digital image gamut mapping method is provided.

In accordance with a first aspect of the present invention, a gamut mapping method includes receiving digital image data including a plurality of input pixel values selected from an input color gamut, each of said input pixel values defined in terms of plural gray values wherein each gray value is in the range of $0 \leq$ gray value $\leq 1$ or wherein each gray value is scaled into this range. Each input pixel value is respectively mapped to an output pixel value. The mapping operation includes: (a) individually inverting the gray values for each input pixel value according to the equation 1-gray value; (b) applying a gamma value ($\gamma$) individually to each inverted gray value according to the equation (inverted gray value)$^\gamma$, the gamma value being related to an amount by which a dynamic lightness range of the digital image data is to be compressed relative to an output color gamut of an image output device, and, (c) inverting each inverted gray value after application of the gamma function thereto according to the equation 1-(inverted gray value)$^\gamma$ so that the gray values defining the input pixel values are mapped to gamma-modified gray values defining the output pixel values, respectively.

In accordance with another aspect of the present invention, a digital image processing apparatus comprises means for input of digital image data of an image in terms of a plurality of input pixel values selected from an input gamut and defined in terms of at least one gray value (or scaled gray value) so that $0 \leq$ (scaled)gray value $<1$; means for output of digital image data in terms of an output color gamut; and, an image processing unit for mapping each input pixel value to an output pixel value. The image processing unit includes means for inverting the at least one gray value to an inverted gray value; means for applying a gamma function to the inverted gray value according to: (inverted gray value)$^\gamma$, wherein $\gamma$ is related to an amount by which the dynamic lightness range of the input image is to be compressed relative to the output color gamut; and, means for converting the inverted gray value, after application of the gamma function, to a non-inverted gray value.

In accordance with yet another aspect of the present invention, a method of mapping an input pixel value defined in terms of a plurality of gray values, which are in or scaled to be in the range of $0 \leq$ gray value $\leq 1$, from a value in an input gamut to an output value in an output gamut includes inverting at least one of the gray values to obtain an inverted gray value and applying a gamma function to the inverted gray value to obtain a gamma-modified inverted gray value according to:

gamma-modified inverted gray value=(inverted gray value)$^\gamma$, wherein $\gamma$ is determined according to:

$\gamma = \log(1-Y_x')/\log(1-Y_x)$ $Y_x = (1-Y_{min})*(1-(X/100))+Y_{min}$ $Y_x' = (1-Y_{min}')*(1-(X/100))+Y_{min}'$ X=a compression percentage in the range of 92%–98%

$Y_{min}$=one of: (i) a darkest expected input pixel luminance value in said image; and (ii) a darkest actual input pixel luminance value in said image, wherein $Y_{min}$ is expressed in terms of $0 \leq Y_{min} \leq 1$ $Y_{min}'$=a darkest output luminance value in said output gamut expressed in terms of $0 \leq Y_{min}' \leq 1$; and, Thereafter, the gamma-modified inverted gray value is, itself, inverted.

One advantage of the present invention is that it provides a new and improved gamut mapping method for color digital images.

Another advantage of the present invention is found in the provision of a gamut mapping method that uses a simple gamma function to control the lightness compression of an input gamut relative to a printer or other output device gamut.

A further advantage of the present invention resides in the provision of a gamut mapping method which uses a combined approach of application of a gamma function and a subsequent clipping operation.

Still another advantage of the present invention is that it may be implemented using one-dimensional tone reproduction curves (via plural one-dimensional look-up tables) which facilitates modification of the gamma function on an image-by-image basis according to statistical parameters for the image.

A still further advantage of the present invention is that it results in an input-to-output relationship so that perceived contrast in an image is not reduced by the subject gamut mapping method.

A yet further advantage of the present invention is the provision of a gamut mapping method which results in aesthetically pleasing output images.

Another advantage of the present invention is that dark colors in an input image are lightened and the chroma thereof increased while light colors in the image are lightened and the chroma thereof decreased to preserve or enhance mid-tone contrast.

Still other benefits and advantages of the present invention will become apparent to those of ordinary skill in the art upon reading and understanding the following detailed description with reference to the attached drawings.

BRIEF DESCRIPTION OF THE DRAWINGS

The invention may take form in various steps and arrangements of steps, and in various components and arrangements of components. The drawings are for purposes of illustrating preferred embodiments of the invention only and are not intended for use in limiting the invention in any way.

DETAILED DESCRIPTION OF PREFERRED EMBODIMENT

Figure 1:
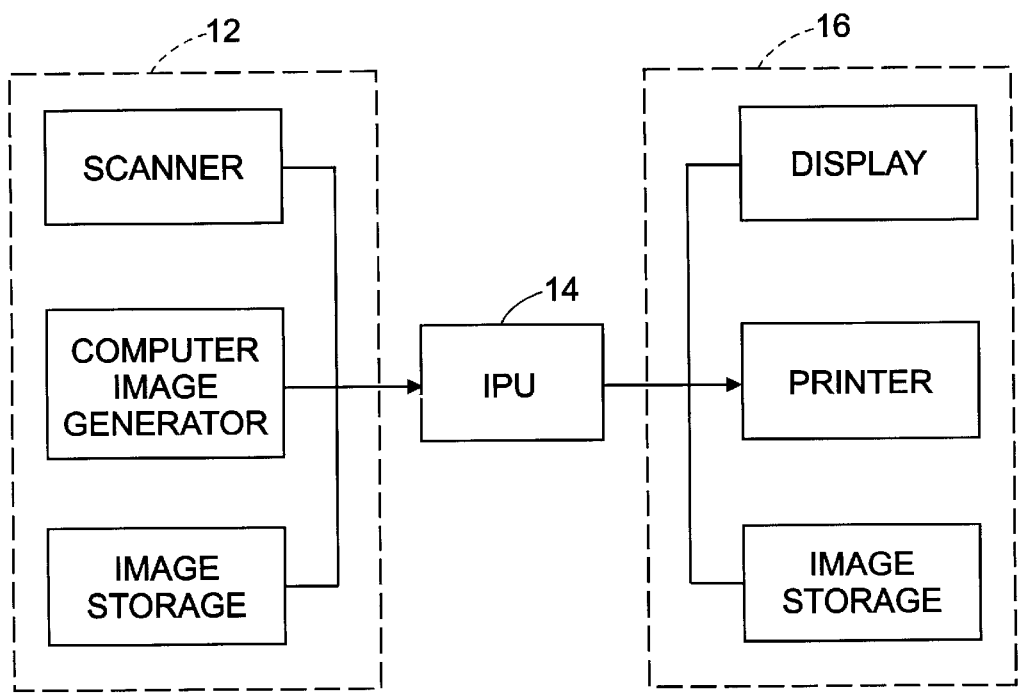
FIG. 1 is a simplified block diagram illustrating a digital image processing apparatus suitable for implementing gamut mapping methods in accordance with the present invention.

Referring now to the drawings where the showings arc for purposes of describing preferred embodiments of the invention only and not for purposes of limiting same, a digital image processing system 10 is shown in FIG. 1. An image input terminal 12 comprises a scanner, computer image generator, image storage device, and/or other source of digital image data which derives and/or delivers digital image data in the form of plural monochromatic separations, wherein the picture elements or "pixels" of each separation are defined at a depth of "d" bits per pixel where "d" is an integer. Accordingly, each pixel of each separation is defined in terms of "d" bits per pixel (bit depth =d), and each pixel has some "gray" value between full "off" (0) and full "on" (1). Those of ordinary skill in the art will recognize that gray values may lie in a different range—e.g., 0–255, but that such gray values are equivalent to gray values in the range of 0–1 for purposes of the present application by virtue of the fact that simple scaling operations may be performed to scale these other gray values into the 0-to-1 range. Due to the fact that the digital image data is provided in terms of at least two monochromatic separations, a color image results when the data from the separations is combined, for example, red-green-blue (RGB) separations or cyan-magenta-yellow (CMY) separations. For ease of understanding the present development, it is described herein with particular reference to the red/green/blue RGB color space. Those skilled in the art will recognize that the method of the present invention is equally applicable to CMY, CMYK, CIELAB, CIEXYZ, or any other suitable color space and that the invention is not intended to be limited for use with any particular color space.

The image signals are input from the image input terminal 12 to an image processing unit (IPU) 14 wherein digital image processing, such as gamut mapping in accordance with the present invention, is performed. The IPU 14 may be provided by any suitable electronic computing apparatus such as an electronic computer, a dedicated electronic circuit, or any other suitable electronic circuit means. The IPU 14 outputs data in a suitable format to an image output terminal 16 such as a digital printer, visual display, and/or image storage device. Suitable apparatus for digital image input and/or output include the Pixelcraft 7650 Pro Imager Scanner, XEROX DocuTech Production Printing System scanners, the XEROX 5775 digital color copier, the XEROX 5760 and 5765 Majestik digital color copiers, or any other suitable digital scanner, copier, and/or image generator.

Figure 2:
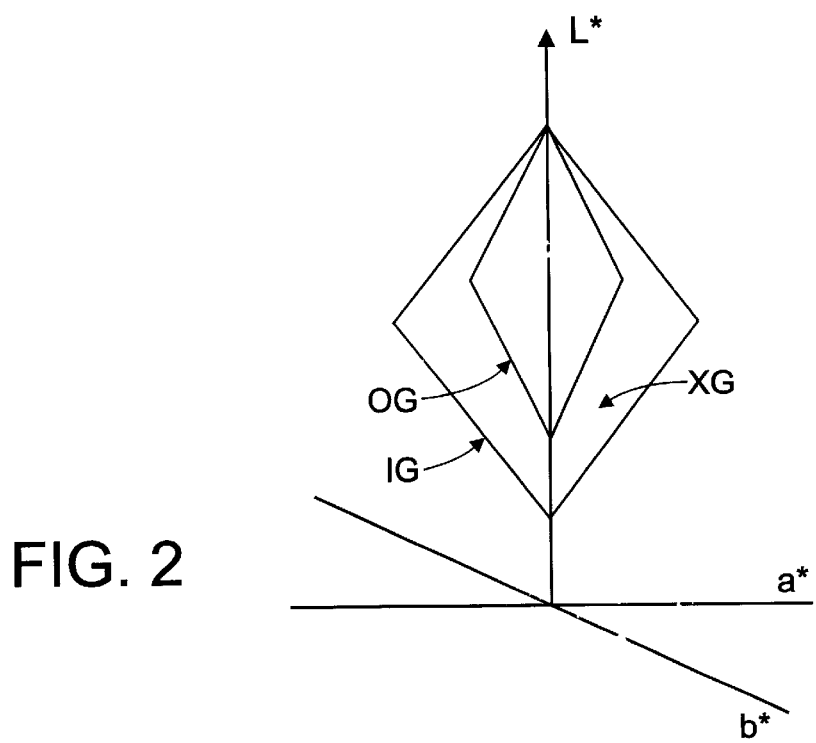
FIG. 2 graphically illustrates gamut mismatch of an input color gamut and an output color gamut in terms of the CIE 1976 L*a*b* (CIELAB) color space.

Referring now to FIG. 2, the gamut mismatch problem addressed and solved by the present invention is graphically illustrated in the CIELAB color space, although it could be illustrated with reference to any other suitable color space. As is generally known in the art, CIELAB is a perceptual color space wherein color is represented in three dimensions according to a lightness value (represented on the L* axis), a redness-greenness value (represented on the a* axis), and a yellowness-blueness value (represented on the b* axis). A first subset of all possible colors in the CIELAB color space comprises all colors in (or potentially in) an input digital image derived and/or delivered by the image input unit 12 and is represented in FIG. 2 by the three-dimensional input gamut IG—i.e., all colors in (or potentially in) the input digital image are graphically located in the area defined within the input gamut IG. Similarly, a second subset of all possible colors in the CIELAB space comprises all colors reproducible by a printer or other output device of the image output terminal 16 and is represented in FIG. 2 by the three-dimensional output gamut OG which is smaller than the input gamut IG. It will be recognized that many colors in the input gamut IG are not included in the output gamut OG and, thus, cannot be reproduced by the printer or other output device of the image output unit 16. These non-reproducible colors are said to be "out-of-gamut" and are identified in FIG. 2 at XG which is the three-dimensional area located between the outer surface of the input gamut IG and the outer surface of the output gamut OG. The present invention presents a new and improved method for mapping the out-of-gamut colors XG into the output gamut OG in a manner which results in an output image created by the image output terminal 16 which is aesthetically pleasing and faithful to the original input image.

Figure 3:
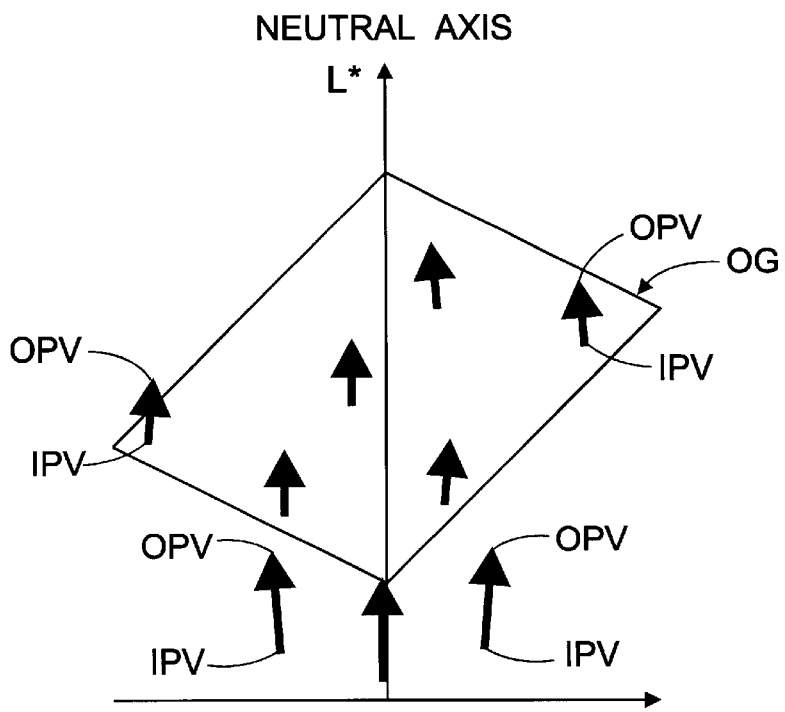
FIG. 3 diagrammatically illustrates a preprocessing operation of gamut mapping in accordance with the present invention.
Figure 4:
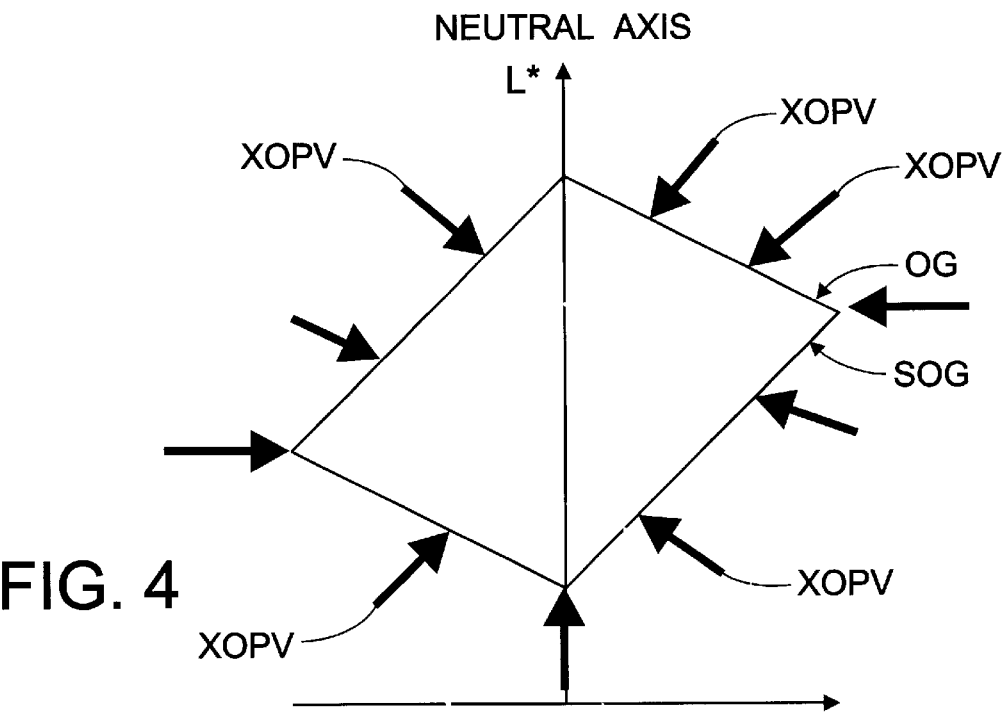
FIG. 4 diagrammatically illustrates a gamut clipping operation of gamut mapping in accordance with the present invention carried out subsequent to the preprocessing step of FIG. 3; and, FIG. 5 is a flow-chart illustrating an overall gamut mapping operation in accordance with the present invention.

With reference now to FIGS. 3 and 4, the output gamut OG is illustrated in a somewhat simplified fashion relative to a neutral (i.e., lightness/darkness) axis such as the L* axis of the CIELAB color space. FIG. 3 graphically illustrates a first processing step, described in detail later, in accordance with the present invention wherein all of the plurality of input pixel color values IPV (represented at the tail of each arrow) comprising the input gamut IG are respectively mapped to a corresponding plurality of output pixel color values OPV (represented at the head or tip of each arrow) so that the dynamic lightness range of the input gamut IG is compressed to that of the output gamut OG. However, as indicated in FIG. 3, not all of the resulting output pixel color values OPV fall within the output gamut OG. In fact, while this mapping operation will map many of the input pixel values IPV into the output gamut OG, it sometimes may cause other in-gamut input pixel values IPV to be moved out-of-gamut. Therefore, as is illustrated in FIG. 4, a gamut clipping operation must also typically be performed to map all out-of-gamut output pixel values XOPV (located at the tail of each arrow in FIG. 4) to values in the output gamut OG as a second processing step. Preferably, a centroid gamut clipping operation is used to map each out-of-gamut value XOPV to the surface SOG of the output gamut OG by moving each value XOPV toward a central point on the neutral axis. Suitable centroid clipping operations are set forth in the (1) Sara and (2) Pariser references noted above. Of course, any other suitable clipping operation (e.g., nearest-point clipping) may be utilized without departing from the overall scope and intent of the present invention, and the invention is not meant to be limited to use of a centroid clipping operation.

Figure 5:
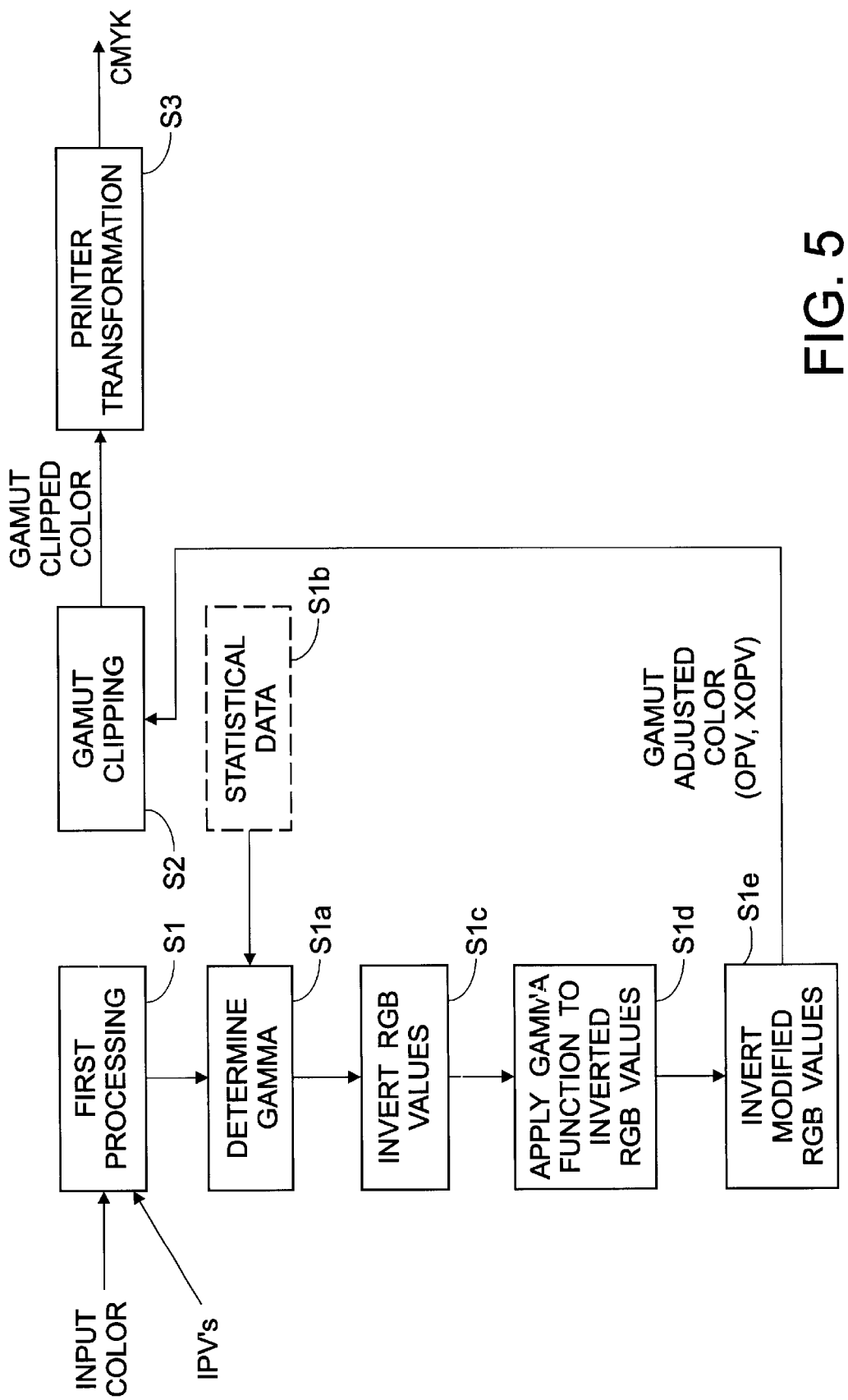

FIG. 5 more particularly illustrates a gamut mapping method in accordance with the present invention comprising the above-described first processing and gamut clipping second processing operations as is carried out in the image processing unit 14. The present invention as illustrated in FIG. 5 is described herein with reference to input pixel color values IPV provided in terms of the red (R), green (G), blue (B) (RGB) color space wherein: $0 \leq R < 1$; $0 \leq G \leq 1$; and, $0 \leq B \leq 1$. Those skilled in the art will recognize that the present invention is not intended to be limited to the RGB color space and the number range describing it, and that it is equally applicable to any other color space. It should be equally understood that the number range between 0 and 1 is used for descriptive purposes in the equations and that modifications to number ranges other than 0 to 1 can be made using straightforward arithmetic.

Input pixel color values IPV's are input to a first processing step or means St which maps the input gamut IG as described above to smoothly compress the dynamic lightness range of the input gamut IG and so that each input pixel value IPV is converted to an output pixel value OPV. Thereafter, a step or means S2 performs the above-described centroid gamut clipping operation or other suitable clipping operation so that any out-of-gamut output pixel values XOPV still present after the first processing step S1 are mapped into the output gamut OG. In the illustrated example, a step or means S3 transforms all of the output pixel values OPV to the required color space for a printer or other output device 16 in a conventional manner, typically from RGB color values to CMYK values.

The first processing step or means S1 comprises a plurality of sub-steps or sub-means S1a–S1e. A step or means S1a determines the amount of lightness compression for the mapping operation referred to herein as "gamma" ($\gamma$). It has been found desirable to determine gamma such that an input pixel color value IPV at 92%–98% (most preferably approximately 95%) of the darkest expected value in an input image correspondingly maps to the same percentage of the darkest possible value in the output gamut OG. The percentage is referred to herein as the "compression percentage." The so determined color value will be referred to as "darkest color" in the following. In a first preferred embodiment of the invention, the darkest expected image value is a predetermined fixed quantity derived by examining a class of similar input images. Of course, since the value of gamma determines the amount of lightness compression resulting from the first processing step S1, the amount of lightness compression is also fixed across all input images. Such an approach has been found to be acceptable in most cases. However, since the computational complexity of the first processing step is minor compared to other image processing operations commonly performed on images, a different approach can be optionally taken. In this second preferred embodiment, a step or means S1b statistically analyzes each individual input image and determines at least the actual darkest input pixel color value therein. The step or means S1b inputs this darkest value, or some function thereof, to the gamma determination step or means S1a. In this manner, the amount of lightness compression in the preprocessing mapping operation is controlled according to the characteristics of each particular input image. Also, when the step or means S1b is used to statistically analyze each input image, unnecessary preprocessing is avoided when the darkest input pixel color value IPV already lies in the output gamut OG. In such case, the gamma determination step or means S1a sets gamma to 1 ($\gamma=1$) so that the first processing operation S1 does not compress the dynamic lightness range of the input gamut IG for that particular input image. The statistical data analysis step or means S1b can also derive other parameters for each input image such as the chroma of the most saturated color in the input gamut in relation to that of the most saturated color in the output gamut. In such case, these additional statistical parameters are then used by the gamut determination step or means S1a to determine gamma accordingly.

Generally, the step or means S1a determines gamma to be in the range of 1–2.5 although the invention is not to be limited to any specific gamma value or range. Preferably, the step or means S1a determines gamma ($\gamma$) according to the following equation:

$$\gamma = \log(1-Y_x')/\log(1-Y_x) \quad (1)$$

where, $$Y_x = (1-Y_{min})*(1-(X/100))+Y_{min} \quad (2)$$

$$Y_x' = (1-Y_{min}')*(1-(X/100))+Y_{min}' \quad (3)$$

X=the compression percentage $Y_{min}$=darkest value expected in or actually in the input gamut IG ($0 \leq Y_{min} \leq 1$)

$Y_{min}'$=darkest value in the output gamut OG ($0 \leq Y_{min}' \leq 1$).

In one example, the compression percentage is selected as X=95%, the darkest input value $Y_{min}$=0.0078, the darkest output value $Y_{min}'$=0.0406. Gamma ($\gamma$) is calculated as follows:

$$Y_x = 0.9922*0.05+0.0078 = 0.05741$$

$$Y_x' = 0.9594*0.05+0.0406 = 0.08857$$

$$\gamma = \log(0.91143)/\log(0.94259) = 1.5686$$

Once gamma is determined according to the foregoing, a step or means S1c inverts the individual RGB values for each of the input pixel values—i.e. the R, G, and B values are each individually inverted. A step or means S1d applies the gamma value to each inverted R, G and B value, individually, resulting in gamma-modified R, G, and B values for each input pixel value IPV. A step or means S1e completes the first processing operation S1 in that it accounts for the previous inversion of the R, G, and B values performed by the step or means S1c by inverting the gamma-modified R, G, and B values.

The operations performed by the steps/means S1c–S1e are expressed by the following equations where $R_{new}$, $G_{new}$, and $B_{new}$ (also referred to as "gamma-modified" R,G,B) are the resulting RGB values derived from the original RGB gray values for each input pixel value IPV:

$$R_{new} = 1-(1-R)^{\gamma}$$

$$G_{new} = 1-(1-G)^{\gamma}$$

$$B_{new} = 1-(1-B)^{\gamma}$$

The first processing operation S1 (including S1a, S1c–S1e or S1a–S1e) results in in-gamut output pixel values OPV and/or out-of-gamut output pixel values XOPV. If any are present, the out-of-gamut output pixel values XOPV are input to the step or means S2 for a gamut clipping operation to map the out-of-gamut values XOPV to the output gamut OG. As noted above, the out-of-gamut values XOPV are preferably mapped to the surface SOG of the output gamut according to a centroid gamut clipping operation although any other clipping operation, such as nearest-point clipping, may be used. Thereafter, all input pixel values IPV are mapped to the output gamut and are input to the printer transformation step or means S3 for transformation to the printer color space or are input to another storage or processing step or means of the image processing apparatus 10 as desired.

Those of ordinary skill in the art will recognize that the gamma value ($\gamma$) need not always be applied equally to each gray value defining the input pixel values IPV. For example, the input pixel values IPV can be defined in terms of a luminance value Y and two chrominance values C1,C2 (e.g., CIELAB). In such case, the above-described gamma processing is applied only to the luminance component Y according to: $Y_{new} = 1-(1-Y)^{\gamma}$. Furthermore, it should be understood that the foregoing, inversion/gamma function/inversion operations described above can be directly applied to gray values scaled to be in a range other than 0 to 1 (e.g., x to y) by simple arithmetic transformation.

The effect of the foregoing gamut mapping method is to lighten and increase the chroma of dark colors and to lighten and decrease the chroma of light colors in the input image. The white points of the input and output gamuts IG,OG are assumed to be normalized so that mapping at the light end of the gamut is not required. A main advantage of the present gamut mapping method is that it preserves or increases the slope of the input image lightness to output image lightness relationship. This, in turn, preserves or enhances mid-tone contrast in the input image.

Furthermore, because the present invention individually maps each gray value comprising an input pixel value IPV, such as the red (R), green (G), and blue (B) gray values, a main advantage of the present invention is that it involves the application of three one-dimensional tone reproduction curves (TRC's) which can be implemented through use of one-dimensional look-up tables created in advance based upon the expected or actual input gamut IG. In such case, the individual gray values defining the input pixel value IPV are used to index three one-dimensional look-up tables, respectively, to obtain a corresponding gray values defining the output pixel value OPV. Alternatively, the gray values defining the output pixel values OPV may be calculated "on-the-fly" through application of the gamma function as described above. Those skilled in the art will recognize that generation, adjustment (based on image statistical data), and indexing one-dimensional look-up tables in this manner is much less computationally intensive than corresponding operations performed with respect to a three-dimensional look-up table according to conventional gamut mismatch solutions, enabling a gamut mapping, process that is a function of an individual image.

The invention has been described with reference to preferred embodiments. Modifications and alterations will occur to others upon reading and understanding the preceding specification. It is intended that the invention be construed as including all such modifications and alterations insofar as they fall within the scope of the appended claims or equivalents thereof.

Having thus described the preferred embodiments of the invention, the invention is claimed to be:

1. A method of digital image processing comprising:

receiving digital image data including a plurality of input pixel values selected from an input color gamut, each of said input pixel values defined in terms of plural gray values wherein each gray value is scaled into the range of $0 \leq$ gray value $\leq 1$, respectively mapping each input pixel value to an output pixel value, said mapping including:

(a) individually inverting said gray values for each input pixel value according to the equation:

1-gray value, (b) applying a gamma value ($\gamma$) individually to each inverted gray value according to the equation:

(inverted gray value)$^{\gamma}$, said gamma value being related to an amount by which a dynamic lightness range of the digital image data is to be compressed relative to an output color gamut of an image output device, and, (c) inverting each inverted gray value after application of said gamma function thereto according to the equation:

$$1-(\text{inverted gray value})^\gamma$$

so that said gray values defining said input pixel values are mapped to gamma-modified gray values defining said output pixel values, respectively.

2. The digital image processing method as set forth in claim 1 wherein, for every output pixel value out-of-gamut relative to said output gamut, said out-of gamut output pixel is mapped to said output gamut using a clipping operation.

3. The digital image processing method as set forth in claim 1 wherein steps (a)–(c) are performed in advance of receiving said digital image data for every input pixel value in said input gamut so that pre-computed gamma-modified gray values defining output pixel values respectively corresponding to each input pixel value in said input gamut are determined, said method further comprising:

storing said pre-computed values in one-dimensional look-up tables; and, for each input pixel value of said received digital image data, accessing said look-up tables to obtain said pre-computed gamma-modified gray values.

4. The digital image processing method as set forth in claim 1 wherein said gamma value ($\gamma$) is selected according to the following equation:

$$\gamma = \log(1-Y_x')/\log(1-Y_x)$$

wherein, $$Y_x = (1-Y_{min})*(1-(X/100))+Y_{min}$$

$$Y_x' = (1-Y_{min}')*(1-(X/100))+Y_{min}'$$

X = a compression percentage in the range of 92%–98%

$Y_{min}$ = a darkest expected input pixel luminance value in said image ($0 \leq Y_{min} \leq 1$)

$Y_{min}'$ = a darkest output luminance value in said output gamut ($0 \leq Y_{min}' \leq 1$).

5. The digital image processing method as set forth in claim 4 wherein said compression percentage (X) is selected as approximately 95% so that approximately 95% of the expected luminance dynamic range of the image is mapped to approximately 95% of the luminance dynamic range of the image output device.

6. The digital image processing method as set forth in claim 1 wherein said gamma value ($\gamma$) is selected according to the following equation:

$$\gamma = \log(1-Y_x')/\log(1-Y_x)$$

wherein, $$Y_x = (1-Y_{min})*(1-(X/100))+Y_{min}$$

$$Y_x' = (1-Y_{min}')*(1-(X/100))+Y_{min}'$$

X = a compression percentage in the range of 92%–98%

$Y_{min}$ = a darkest actual input pixel luminance value in said ($0 \leq Y_{min} \leq 1$)

$Y_{min}'$ = a darkest output luminance value in said output gamut ($0 \leq Y_{min}' \leq 1$).

7. The digital image processing method as set forth in claim 6 wherein said compression percentage (X) is selected as approximately 95% so that approximately 95% of the actual luminance dynamic range of the image is mapped to approximately 95% of the luminance dynamic range of the image output device.

8. The digital image processing method as set forth in claim 1 wherein said mamma value is selected to be in the range of $\gamma=1$ to $\gamma=2.5$.

9. The digital image processing method as set forth in claim 1 wherein each of said input pixel values is defined in terms of red (R), green (G), and blue (B) gray values wherein said mapping steps (a)–(c) are carried out according to:

$$\text{gamma-modified } R = 1-(1-R)^\gamma$$

$$\text{gamma-modified } G = 1-(1-G)^\gamma$$

$$\text{gamma-modified } B = 1-(1-B)^\gamma.$$

10. The digital image processing method as set forth in claim 2 wherein said out-of-gamut output pixel values are mapped directly into the output gamut by one of a nearest-point clipping and a centroid clipping mapping operation.

11. The digital image processing method as set forth in claim 1 wherein each of said input pixel values is defined in terms of a luminance value Y, a first chrominance value C1, and a second chrominance value C2, wherein said gamma value is applied only to the luminance value Y according to:

$$\text{gamma-modified } Y = 1-(1-Y)^\gamma.$$

12. The digital image processing method as set forth in claim 11 wherein the input pixel value is defined in terms of CIELAB color space.

13. A digital image processing apparatus comprising:

means for input of digital image data of an image in terms of a plurality of input pixel values selected from an input gamut and defined in terms of at least one gray value in or scaled into the range of 0 to 1;

means for output of digital image data in terms of an output color gamut; and, an image processing unit for mapping each input pixel value to an output pixel value, said image processing unit comprising:

means for inverting said at least one gray value to an inverted gray value;

means for applying a gamma function to said inverted gray value according to: (inverted gray value)$^\gamma$, wherein gamma ($\gamma$) is related to an amount by which a dynamic lightness range of the input image is to be compressed relative to the output color gamut; and, means for converting the inverted gray value, after application of said gamma function, to a non-inverted gray value.

14. The digital image processing apparatus as set forth in claim 13 further comprising:

means for deriving gamma ($\gamma$) based upon one of:
    (i) a darkest expected input pixel luminance value in said image; and,
    (ii) a darkest actual input pixel luminance value in said image.

15. The digital image processing apparatus as set forth in claim 14 wherein said means for deriving gamma ($\gamma$) derives gamma according to:

$$\gamma = \log(1-Y_x')/\log(1-Y_x)$$

wherein, $$Y_x = (1-Y_{min})*(1-(X/100))+Y_{min}$$

$$Y_x'=(1-Y_{min}')*(1-(X/100))+Y_{min}'$$

X=a compression percentage in the range of 92%–98%

$Y_{min}$=one of a darkest expected input pixel luminance value in said image expressed in terms of ($0 \leq Y_{min} \leq 1$)

$Y_{min}'$=a darkest output luminance value in said output gamut expressed in terms of ($0 \leq Y_{min}' \leq 1$).

16. The digital image processing apparatus as set forth in claim 15 wherein said compression percentage is selected to be 95%.

17. The digital image processing apparatus as set forth in claim 13 further comprising:

means for clipping output pixel values which are outside said output gamut to obtain associated in-gamut output pixel values.

18. The digital image processing apparatus as set forth in claim 17 wherein said clipping means maps out-of-gamut output pixel values into the output gamut by one of a nearest-point clipping and a centroid clipping mapping operation.

19. The digital image processing apparatus as set forth in claim 13 wherein each of said input pixel values is defined in terms of red (R), green (G), and blue (B) gray values each expressed in terms of a value in the range of 0–1, wherein said inversion means, said gamma function application means, and said converting means operate on said gray values according to:

$$\text{gamma-modified } R=1-(1-R)^\gamma$$

$$\text{gamma-modified } G=1-(1-G)^\gamma$$

$$\text{gamma-modified } B=1-(1-B)^\gamma$$

wherein gamma-modified R, gamma-modified G, and gamma-modified B define said output pixel value mapped from said input pixel value.

20. The digital image processing apparatus as set forth in claim 13 wherein each of said input pixel values is defined in terms of a luminance value Y, a first chrominance value C1, and a second chrominance value C2, wherein said gamma function application means operates only on said luminance value Y of each input pixel value according to:

$$\text{gamma-modified } Y=1-(1-Y)^\gamma,$$

wherein said output pixel value is defined in terms of gamma-modified Y and said first and second chrominance values C1,C2.

21. A method of mapping an input pixel value defined in terms of a plurality of gray values, each of said gray values having a scaled value in the range of 0 to 1, from a value in an input gamut to an output value in an output gamut, said method comprising:

inverting at least one of said gray values to obtain an inverted gray value;

applying a gamma function to said inverted gray value to obtain a gamma-modified inverted gray value according to:

gamma-modified inverted gray value=(inverted gray value)$^\gamma$, wherein $\gamma$ is determined according to:

$$\gamma=\log(1-Y_x')/\log(1-Y_x)$$

$$Y_x=(1-Y_{min})*(1-(X/100))+Y_{min}$$

$$Y_x'=(1-Y_{min}')*(1-(X/100))+Y_{min}'$$

X=a compression percentage in the range of 92%–98%

$Y_{min}$=one of: (i) a darkest expected input pixel luminance value in said image; and (ii) a darkest actual input pixel luminance value in said image, wherein $Y_{min}$ is expressed in terms of $0 \leq Y_{min} \leq 1$ $Y_{min}'$=a darkest output luminance value in said output gamut expressed in terms of $0 \leq Y_{min}' \leq 1$; and, inverting said gamma-modified inverted gray value.

* * * * *